Jan. 10, 1933.  E. G. SULLIVAN  1,893,851
APPARATUS FOR PRODUCING SOLID CARBON DIOXIDE
Filed Feb. 17, 1931   3 Sheets-Sheet 3
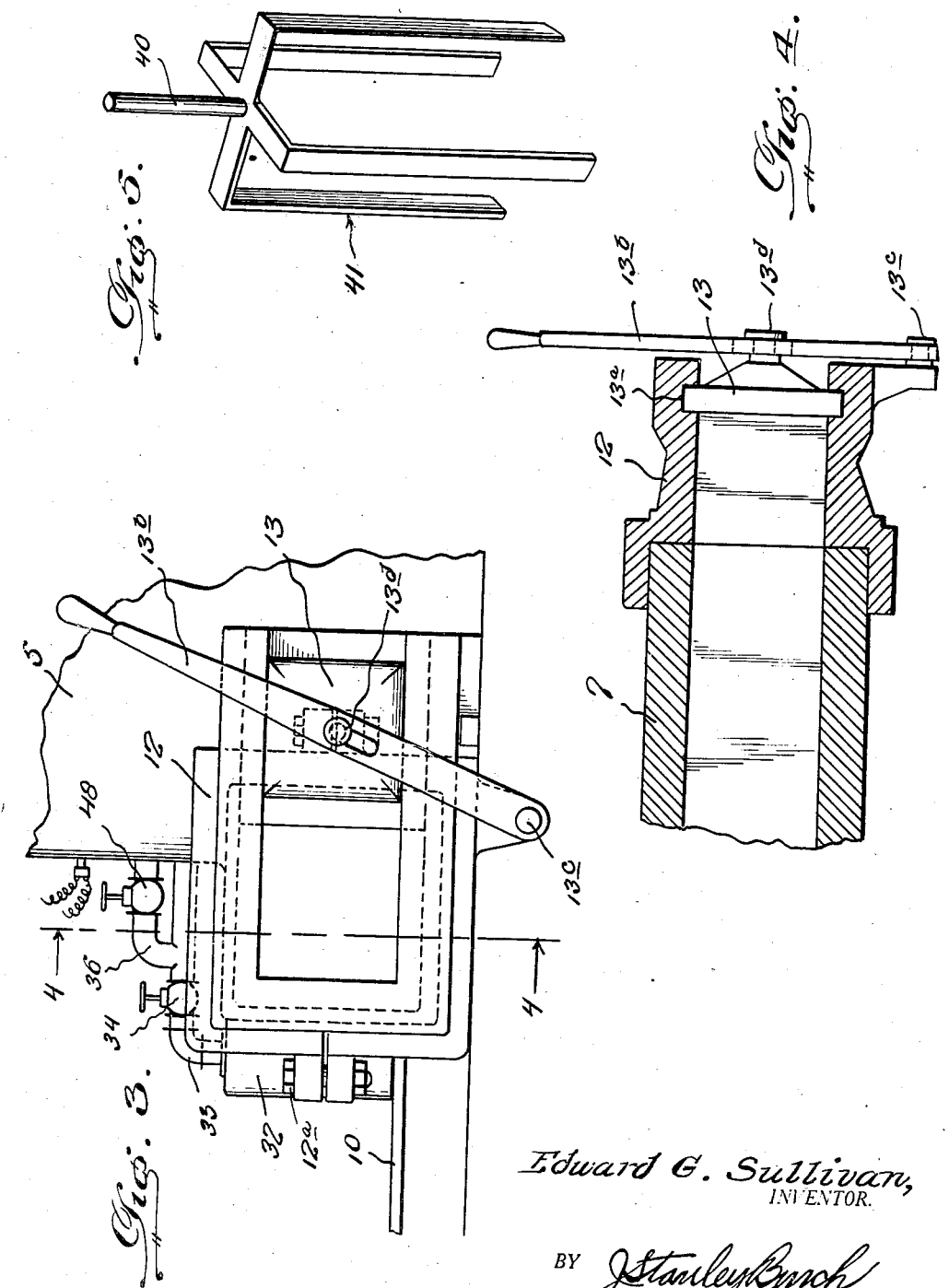
Edward G. Sullivan,
INVENTOR.
BY J. Stanley Burch
ATTORNEY.

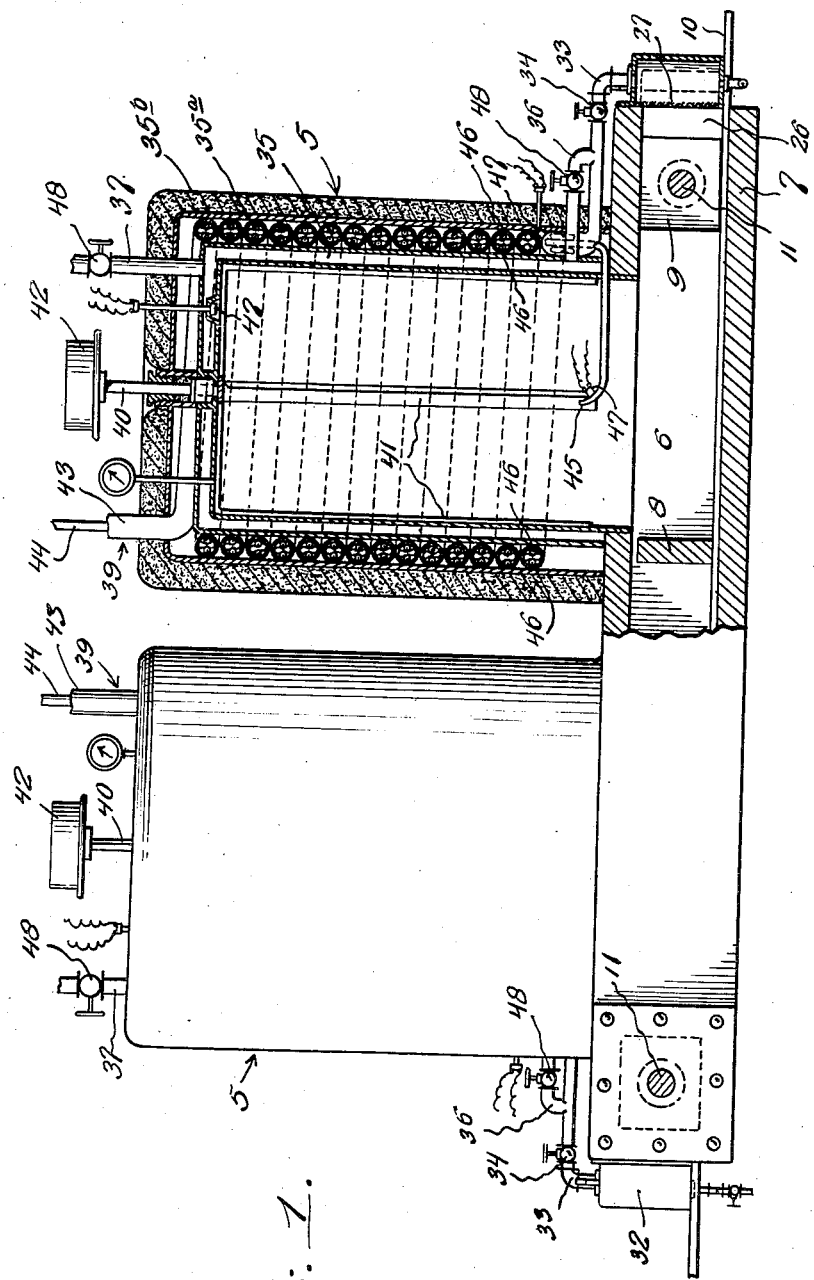

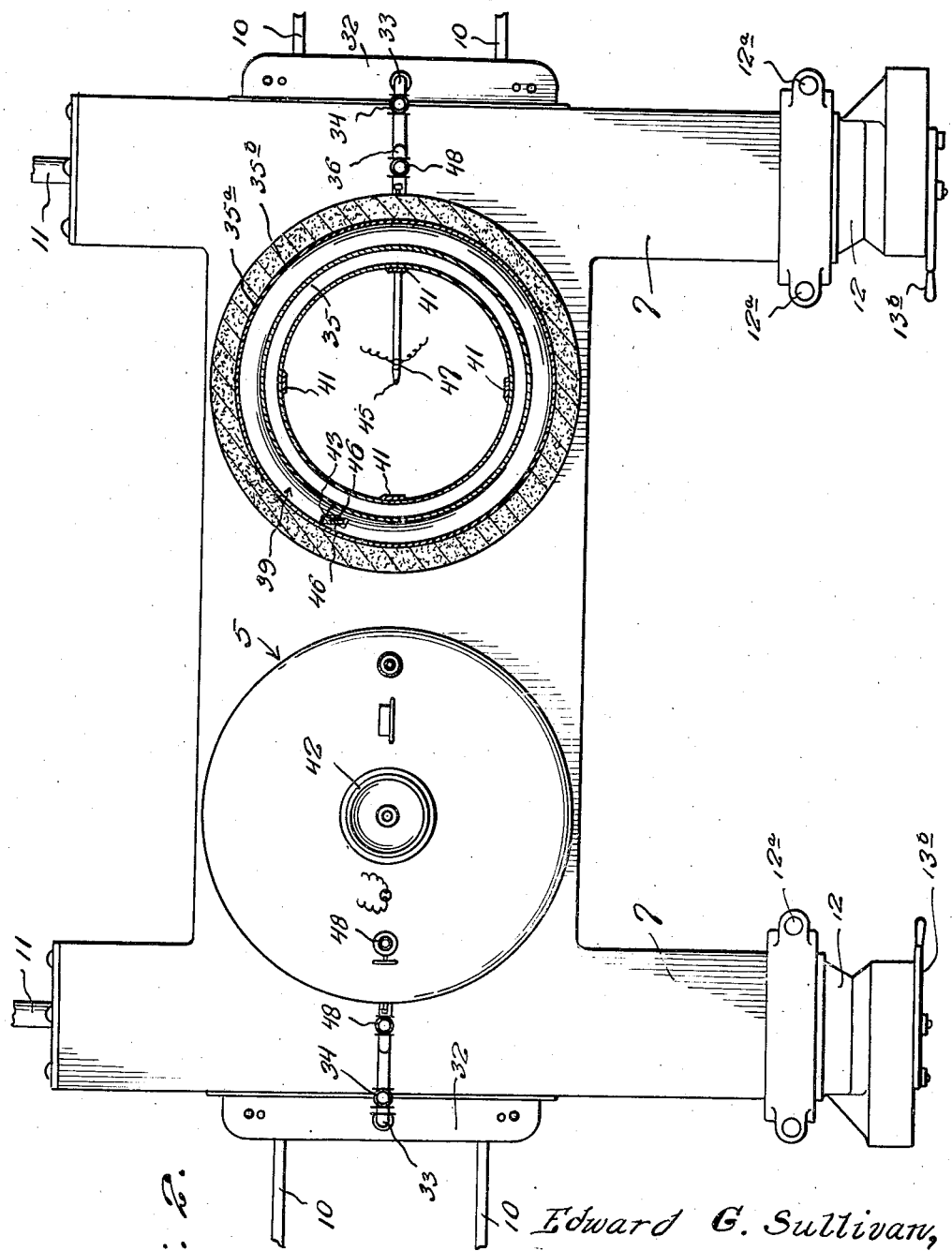

Patented Jan. 10, 1933

1,893,851

UNITED STATES PATENT OFFICE

EDWARD G. SULLIVAN, OF AMARILLO, TEXAS, ASSIGNOR TO JOSEPH S. BELT, OF AMARILLO, TEXAS

APPARATUS FOR PRODUCING SOLID CARBON DIOXIDE

Application filed February 17, 1931. Serial No. 516,490.

The present invention relates to quantity production of solid carbon dioxide, such as is now commonly used for refrigeration purposes.

An object of the present invention is to provide a new and improved apparatus for producing solid carbon dioxide from flue gases occasioned by the burning of natural gas, and by means of which separation and solidification of the carbon dioxide contained in the flue gases is directly effected mechanically.

An object of the present invention is to provide such novel features whereby a comparatively large percentage of the carbon dioxide may be transformed to snow.

A still further object of the invention is to provide an improved apparatus of the above kind embodying means for converting the carbon dioxide gas to snow, means for collecting the snow thus produced, and means for compacting the collected snow so that it may be readily cut into block form for commercial use, said means being of such character and so related as to provide for efficient and continuous operation.

Other objects and features of my invention will be more evident from the following description when taken in connection with the accompanying drawings, in which Figure 1 is a view partly in rear elevation and partly in vertical transverse section, of an apparatus constructed in accordance with the present invention.

Figure 2 is a view thereof partly in top plan and partly in horizontal section.

Figure 3 is an enlarged fragmentary elevational view showing details of the nozzles employed on the discharge ends of the press chambers.

Figure 4 is a fragmentary vertical section on line 4—4 of Figure 3; and

Figure 5 is a perspective view of the scraper for freeing the snow from the walls of each converting chamber of the apparatus.

The present invention contemplates the production of solid carbon dioxide from flue gases occasioned by the burning of natural gas in the presence of air and containing approximately 10% carbon dioxide and 90% nitrogen. Before being supplied to the present apparatus, the flue gases are suitably dried, compressed to from 2900 pounds to 4000 pounds and cooled to from $-62°$ C. to $-73°$ C., the pressure and temperature being such that when the flue gases are expanded to drop the pressure to about 150 pounds a large percentage of the carbon dioxide gas in the flue gases will be converted directly to a solid and without any intermediate step of liquefaction of the carbon dioxide gas.

As shown in the drawings, the present apparatus includes one or more converting chambers 5, preferably of vertical cylindrical form, and into which the flue gases are adapted to be expanded for direct solidification of the carbon dioxide gas contained therein. The converting chamber or chambers 5 are carried upon a base including a central collecting chamber 6 which communicates through the top thereof directly with the converting chamber or chambers 5 through the open bottom portions of the latter, thereby permitting the snow from the converting chambers to readily fall into and collect within the chamber 6. The base further includes a press chamber 7 disposed at each side of the collecting chamber 6 and directly communicating with the latter intermediate the ends of the press chambers. Slidably fitted in the collecting chamber 6 for movement transversely of the apparatus is a pusher or feed plate 8 by means of which the snow may be fed from the collecting chamber 6 to the respective press chambers 7 at the desired intervals. Operating in the press chambers 7 are suitable plungers or pistons 9 by means of which the snow fed in front of said plungers by the pusher plate 8 is compacted in the forward ends of the press chambers to be subsequently ejected and cut into block form for commercial use. Operating rods 10 are provided for the pusher plate 8, while plungers 9 have operating rods 11. Suitable mechanism may be associated with the rods 10 and 11 for effecting proper timed actuation of the pusher plate 8 and plungers or pistons 9. This mechanism is not shown or described in detail herein as it forms no specific part of the present invention.

Suitable contracted nozzles of the desired shape are attached to the forward outlet ends of the press chambers 7 as at 12, so that the desired size and contour may be given to the compressed snow as it is ejected from the press chambers. These nozzles are preferably detachable so that any desired form of nozzle may be supplied according to the need, and for this purpose, the inner ends of the nozzles are divided and connected by clamping bolts as at 12a so that the nozzles may be readily applied to or removed from the forward discharge ends of the press chambers. Each nozzle is provided with a sliding shut-off or gate 13 whereby the discharge ends of the press chambers may be initially closed until a quantity of the snow has been compressed in the forward portions of the press chambers. After this has been accomplished, the compressed body of snow in the forward end of each press chamber will act as a plug against which the snow may be subsequently compacted, and as the packing of the snow proceeds, this body of compressed snow will be ejected through the nozzles 12 for being severed into block form. As shown, the outer ends of the nozzles 12 are provided with guideways as at 13a in which the gate 13 is slidably mounted, and a handle 13b is pivoted to the bottom of the nozzle as at 13c and pivotally and slidably connected with each associated gate 13 as at 13d so that said gate may be conveniently manually opened or closed.

It is particularly pointed out that the general combination and arrangement of parts hereinbefore described is substantially the same as that set forth in my copending application Ser. No. 516,489, filed Feb. 17, 1932, the principal difference being that in the present case cylindrical converting chambers and other associated parts of particular form are substituted for the segmento-cylindrical converting chamber and rotary refrigerating member of said co-pending application. As is also shown in said co-pending application, openings 26 are provided in the outer sides of the press chambers 7 intermediate the ends of the latter for the escape of nitrogen and any carbon dioxide gas which may not solidify, and extended across these openings so as to permit the escape of gas but to prevent escape of any of the snow are screens 27. Each screen is preferably in the form of a web having its ends attached to opposed rollers journaled vertically at opposite sides of each opening 26, and means is provided for operating these rollers so as to bring a new length of screen in position across the respective openings from time to time as the previously used portions of the screens become partly clogged with snow. The above gas outlet features, as well as means for melting the snow on the used portion of the screens after they are wound upon either associated roller, are set forth and claimed in detail in the co-pending application referred to above. As is also shown in said co-pending application, a casing 32 is provided outside each opening 26 so as to form within each of the same a gas outlet chamber having a top gas outlet pipe 33 provided with a control valve 34.

Each converting chamber 5 includes an inner chamber proper of the double-walled construction so as to provide between the walls thereof a cooling chamber 35. The gas outlet pipes 33 have branches 36 communicating with the cooling chambers 35 of the respective converting chambers, so that the escaping cold gases are supplied to the cooling chambers 35. Another pipe leads from the cooling chamber 35 of each converting chamber to provide for the exhaust or escape of the gases after exerting their cooling influence upon the inner walls of the converting chambers 5. Each converting chamber 5 also includes an outer casing 35a suitably heat-insulated as at 35b, and arranged within the space between this casing 35a and the converting chamber proper therein is a coiled heat exchange element of the type disclosed in my U. S. patent upon heat exchanger No. 1,852,490 dated Apr. 5, 1932. This heat exchange unit is indicated generally at 39, and is shown herein for sake of simplicity as involving a single coiled element instead of a plurality of elements disposed side by side as illustrated in Figure 5 of the latter co-pending application. The details and purpose of this heat exchange element will be later set forth.

Means is provided for freeing the snow from the walls of the converting chambers as it may stick or adhere thereto. For this purpose, the top of each converting chamber has a central bearing in which is journaled a shaft 40 having a scraper 41 fixed on its lower end and provided at its upper end with a pulley 42 so that the scraper may be operated by power from a suitable source. The scraper 41 preferably consists of crossed angular blades arranged to contact the top and side walls of the associated converting chamber. Thus, when the scraper is rotated, it effectively removes any snow from the walls of the associated converting chamber that may stick or adhere to said wall. As the snow forms in each converging chamber and as it is also removed from the walls of the said chamber, it falls by gravity into and collects within the collecting chamber 6.

Briefly described, the heat exchange unit or element 39 associated with each converting chamber consists of an outer fluid conduit 43 which connects at its lower end with the gas outlet pipe 33 at the adjacent side of the apparatus, and which opens to the atmosphere through the top of the associated converting chamber. This heat exchange unit or element further includes an inner fluid conduit 44 to which is supplied from a suitable source flue gases which have been previously dried, compressed and preliminarily cooled. The outlet of the inner conduit 44 extends into the lower portion of the associated converting chamber 5 and terminates in an upturned nozzle 45 from which the flue gases are discharged for being expanded into the associated converting chamber. The conduit 44 is in the form of a flattened spirally twisted tube having coiled about the same additional tubes 46 as clearly set forth in my co-pending application for patent upon heat exchanger, mentioned above. These additional tubes are indicated at 46 and open at their lower ends within the conduit 39 in communication with the gas escape pipe 33 connected thereto. The escaping gas is thus caused to flow between the conduits 43 and 44 and also through the pipes 46 for thoroughly cooling the flue gases flowing through the conduit 44. In addition, the heat exchange element 39 aids in supercooling the converting chamber which it surrounds, so that a relatively large percentage of the carbon dioxide in the flue gases is converted to a solid. Suitable thermo-couples 47 may be employed adjacent the nozzles 45, within the top of each converting chamber, and within the conduit 43, as well a at other suitable or desired points, for facilitating maintenance of proper temperatures at these places whereby maximum efficiency of operation may be had. The pipes 36 and 37 are also provided with control valves 48 which, together with the control valve 34, permit control of the escaping gas and maintenance of a back pressure upon the gas within the converting chambers, so that too rapid or free escape of the gases from the converting chambers may be prevented.

In operation, flue gases which have been previously dried, compressed and preliminarily cooled, are supplied under pressure through the conduits 44 and nozzles 45 into the converting chambers 5. As the flue gases escape from the nozzles 45, they expand and lower in temperature so that after continued operation the temperature within the converting chambers will be lower than the critical temperature of the carbon dioxide gas in the flue gases for the pressure which maintains in the converting chambers. As the carbon dioxide is discharged into the converting chambers, it expands and is converted directly to a solid, some of the solid carbon dioxide or snow falling directly into the collecting chamber 6. Such of the snow which adheres to the walls of the converting chambers is freed therefrom by the scrapers 41 and falls into the collecting chamber 6. As the snow accumulates in the collecting chamber, the pusher plate 8 is shifted to feed the press chambers 7 in which the snow is compacted and from which the compacted snow is ejected or discharged through the nozzles 12 for being cut or severed into block form. In beginning operation of the apparatus, the gates 13 are closed until a body of snow is compacted within the forward discharge ends of the press chambers 7. The gates 13 are then opened and, upon continued operation, the compressed body of snow in the forward end of each press chamber acts as a plug against which additional snow may be compacted. As the compacting of snow continues, the compacted body in the forward end of each press chamber is ejected as set forth above.

From the foregoing description it is believed that the construction and operation, as well as the objects and features of the present invention, will be readily understood and appreciated by those skilled in the art. It is obvious that various changes and substitutions of equivalents may be resorted to without departing from the spirit and scope of the invention as claimed.

What we claim as new is:

1. In an apparatus for producing solid carbon dioxide, a converting chamber having a bottom snow collecting chamber, a countercurrent heat exchange element coiled about the converting chamber and including an inner conduit terminating in an expansion nozzle arranged to discharge flue gases into the converting chamber, said heat exchange element further including an outer conduit connected to the collecting chamber for the escape of nitrogen and unsolidified carbon dioxide gas therethrough from said collecting and converting chambers, and means to control the escape of gas from the collecting and converting chambers through said outer conduit.

2. In an apparatus for producing solid carbon dioxide, a converting chamber proper having a bottom snow collecting chamber and provided with a gas escape opening, said converting chamber proper being of double-walled construction to provide a cooling chamber between the walls thereof, a countercurrent heat exchange element coiled about the converting chamber proper and including inner and outer conduits, said inner conduit adapted for connection with a source of supply of flue gases and terminating in a nozzle arranged to discharge within the converting chamber, and means to conduct the escaping gas from the collecting chamber to the outer conduit of the heat exchange element and to the cooling chamber of the converting chamber.

3. In an apparatus for producing solid carbon dioxide, an upright cylindrical converting chamber completely open at the bottom and having a bottom snow collecting chamber, means to expand flue gases into said converting chamber, means to utilize escaping unsolidified gas from the converting chamber to cool the flue gases prior to expansion thereof and to cool the converting chamber, and an inverted U-shaped scraper for removing snow from the top and side inner surfaces of said converting chamber.

In testimony whereof I affix my signature.

EDWARD G. SULLIVAN.